US011753063B2

(12) United States Patent
Ku et al.

(10) Patent No.: US 11,753,063 B2
(45) Date of Patent: Sep. 12, 2023

(54) STEERING COLUMN FOR VEHICLE

(71) Applicant: HL MANDO CORPORATION, Pyeongtaek-si (KR)

(72) Inventors: Sang Chul Ku, Seoul (KR); Kwon Ho Lee, Yongin (KR); Sung Hun Park, Anyang (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 17/793,192

(22) PCT Filed: Feb. 24, 2021

(86) PCT No.: PCT/KR2021/002310
§ 371 (c)(1),
(2) Date: Jul. 15, 2022

(87) PCT Pub. No.: WO2021/172865
PCT Pub. Date: Sep. 2, 2021

(65) Prior Publication Data
US 2023/0055548 A1    Feb. 23, 2023

(30) Foreign Application Priority Data

Feb. 25, 2020    (KR) .................. 10-2020-0022660

(51) Int. Cl.
*B62D 1/187*    (2006.01)
*B62D 1/181*    (2006.01)

(52) U.S. Cl.
CPC ............. *B62D 1/187* (2013.01); *B62D 1/181* (2013.01)

(58) Field of Classification Search
CPC ..................................................... B62D 1/181
See application file for complete search history.

(56) References Cited

U.S. PATENT DOCUMENTS

| | | | | |
|---|---|---|---|---|
| 4,785,684 A * | 11/1988 | Nishikawa | ............. | B62D 1/181 |
| | | | | 280/775 |
| 5,036,720 A * | 8/1991 | Shirasawa | ............. | B62D 1/181 |
| | | | | 74/89.42 |
| 5,911,789 A | 6/1999 | Keipert | | |
| 7,410,190 B2 * | 8/2008 | Sawada | .................... | B62D 1/19 |
| | | | | 280/775 |
| 8,919,220 B2 * | 12/2014 | Moriyama | ............. | B62D 1/197 |
| | | | | 280/775 |
| 10,189,496 B2 * | 1/2019 | King | ..................... | B62D 1/184 |
| 10,457,313 B2 * | 10/2019 | Nash | ..................... | B62D 1/183 |
| 10,633,013 B2 * | 4/2020 | Kreutz | .................. | B62D 1/181 |
| 10,661,819 B2 * | 5/2020 | Heitz | ..................... | B62D 1/185 |
| 10,989,284 B2 * | 4/2021 | Terada | .................. | B62D 7/224 |

(Continued)

FOREIGN PATENT DOCUMENTS

| CN | 110015337 A | * | 7/2019 | ............. | B62D 1/181 |
|---|---|---|---|---|---|
| CN | 114524016 A | * | 5/2022 | ............. | B62D 1/181 |

(Continued)

*Primary Examiner* — Nicole T Verley
(74) *Attorney, Agent, or Firm* — Harvest IP Law, LLP

(57) ABSTRACT

According to the present embodiments, a telescopic stroke is increased while an installation space of a steering column is easily secured, and a telescopic operation can be quickly performed without increasing a motor output. During the telescopic operation, noise may be reduced, and assemblability and mass productivity of the steering column may be improved.

13 Claims, 15 Drawing Sheets

(56) References Cited

U.S. PATENT DOCUMENTS

| | | | | |
|---|---|---|---|---|
| 11,498,603 B2* | 11/2022 | Zhang | ................... | F16H 25/20 |
| 2003/0222448 A1* | 12/2003 | Arihara | ................ | B62D 1/181 |
| | | | | 280/775 |
| 2009/0100956 A1* | 4/2009 | Warashina | ............ | B62D 1/181 |
| | | | | 74/493 |
| 2011/0314954 A1* | 12/2011 | Matsuno | ................ | B62D 1/181 |
| | | | | 74/493 |
| 2012/0247259 A1* | 10/2012 | Mizuno | ................. | B62D 1/181 |
| | | | | 74/493 |
| 2018/0050720 A1* | 2/2018 | King | .................... | B62D 1/184 |
| 2018/0134308 A1* | 5/2018 | Derocher | ........... | F16H 25/2204 |
| 2019/0210633 A1* | 7/2019 | Derocher | ........... | B62D 1/181 |
| 2019/0225255 A1* | 7/2019 | Ishimura | ............... | B62D 1/185 |
| 2019/0322307 A1* | 10/2019 | Kwon | .................. | B62D 1/192 |
| 2021/0061340 A1* | 3/2021 | Wilkes | .................. | B62D 1/185 |
| 2021/0129891 A1* | 5/2021 | Ryne | ..................... | B62D 1/185 |
| 2021/0129892 A1* | 5/2021 | Ryne | ..................... | B62D 1/185 |
| 2023/0043788 A1* | 2/2023 | Ponikiewski | ......... | B62D 1/181 |
| 2023/0090642 A1* | 3/2023 | Ponikiewski | ......... | B62D 1/181 |
| | | | | 74/493 |

FOREIGN PATENT DOCUMENTS

| | | | | |
|---|---|---|---|---|
| DE | 102017218894 A1 * | 4/2019 | ............. | B62D 1/181 |
| DE | 102020204419 A1 * | 10/2020 | ............. | B62D 1/16 |
| DE | 102020210623 A1 * | 3/2021 | ............. | B62D 1/16 |
| DE | 102020129086 A1 * | 5/2021 | ............. | B62D 1/181 |
| DE | 102020129216 A1 * | 5/2021 | ............. | B62D 1/181 |
| DE | 112020001223 T5 * | 12/2021 | ............. | B62D 1/181 |
| DE | 102022104146 A1 * | 9/2022 | ............. | B62D 1/181 |
| EP | 1767432 A1 * | 3/2007 | ............. | B62D 1/181 |
| EP | 2055611 A1 * | 5/2009 | ............. | B62D 1/181 |
| EP | 2500241 A2 * | 9/2012 | ............. | B60R 25/02 |
| EP | 2508409 A2 * | 10/2012 | ............. | B62D 1/181 |
| EP | 2572960 A1 * | 3/2013 | ............. | B62D 1/181 |
| EP | 2572961 A1 * | 3/2013 | ............. | B62D 1/181 |
| EP | 3162655 A1 * | 5/2017 | ............. | B62D 1/181 |
| FR | 3001941 A1 * | 8/2014 | ............. | B62D 1/181 |
| FR | 3103446 A3 * | 5/2021 | ............. | B62D 1/181 |
| JP | H1143052 A * | 7/1997 | | |
| JP | 2001199350 A * | 7/2001 | ............. | B62D 1/181 |
| JP | 2003341528 A | 12/2003 | | |
| JP | 2012011786 A | 1/2012 | | |
| KR | 20080102451 A * | 5/2007 | | |
| KR | 20130033663 A * | 9/2011 | | |
| KR | 20120060975 A | 6/2012 | | |
| KR | 101724202 B1 * | 8/2015 | | |
| KR | 20190123457 A * | 4/2018 | | |
| KR | 20210112808 A * | 3/2020 | | |
| KR | 20220121488 A * | 2/2021 | | |
| KR | 20210133870 A | 4/2021 | | |
| KR | 20220139238 A | 4/2022 | | |
| WO | WO-2021049803 A1 * | 3/2021 | ............. | B62D 1/181 |
| WO | WO-2021099599 A1 * | 5/2021 | ............. | B62D 1/181 |
| WO | WO-2022207530 A1 * | 10/2022 | | |

* cited by examiner

STEERING COLUMN FOR VEHICLE

CROSS REFERENCE TO RELATED APPLICATIONS

This application is a National Stage of International Application No. PCT/KR2021/002310 filed on Feb. 24, 2021, claiming priority to Korean Patent Application No. 10-2020-0022660 filed on Feb. 25, 2020, the disclosures of which is incorporated herein by reference in its entirety.

TECHNICAL FIELD

The present embodiments relate to a steering column of a vehicle and, more specifically, a steering column of a vehicle, which is capable of easily securing an installation space of a steering column while increasing the telescopic stroke, quickly performing telescoping without increasing the motor output, reducing noise during telescoping, and enhancing the assemblability and mass-productivity of steering columns.

BACKGROUND ART

In general, the steering column of a vehicle comes with telescoping and tilting features by which the driver may adjust the protrusion and tilt angle of the steering wheel to fit his height or body shape to enable smooth steering.

Recently being developed are vehicles capable of self-driving to the destination even without the driver's manipulation on the steering wheel, accelerator pedal, and brake, and a demand arises for securing a larger space for the driver's convenience while self-driving.

To that end, a scheme for increasing the telescope-in stroke of the steering shaft is attempted. In the conventional steering column performing telescoping using a screw, it has been attempted to increase the entire length of the screw or the lead of the screw to increase the telescope-in stroke. However, increasing the length of the screw causes the entire length of the steering column to be overly increased given the space in the vehicle, and increasing the lead of the screw is unrealistic considering the self-locking condition of the screw.

Further, increasing the stroke requires increasing the telescope speed. Increasing the motor power for the purpose of quicker telescoping is disadvantageous in light of noise, weight, and size. Thus, a need exists for a more appropriate approach.

DETAILED DESCRIPTION OF THE INVENTION

Technical Problem

The present embodiments have been conceived in the foregoing background and relate to a steering column of a vehicle, which is capable of easily securing an installation space of a steering column while increasing the telescopic stroke, quickly performing telescoping without increasing the motor output, reducing noise during telescopic operation, and enhancing the assemblability and mass-productivity of steering columns.

Technical Solution

According to the present embodiments, there may be provided a steering column of a vehicle, comprising a telescopic module including a telescopic bolt including a first bolt portion and a second bolt portion threaded in opposite directions, a first nut coupled to the first bolt portion, a second nut coupled to the second bolt portion, and a telescopic driving unit, a nut block open to a radial side and having a guide hole into which the first nut is inserted, a mounting bracket coupled with a lower tube and having a lower end coupled with the nut block, and an upper tube inserted into the lower tube, coupled with a steering shaft, and coupled with the second nut.

Advantageous Effects

According to the present embodiments, it is possible to easily secure an installation space of a steering column while increasing the telescopic stroke, quickly perform telescoping without increasing the motor output, reduce noise during telescopic operation, and enhance the assemblability and mass-productivity of steering columns.

MODE FOR CARRYING OUT THE INVENTION

Figure 1:
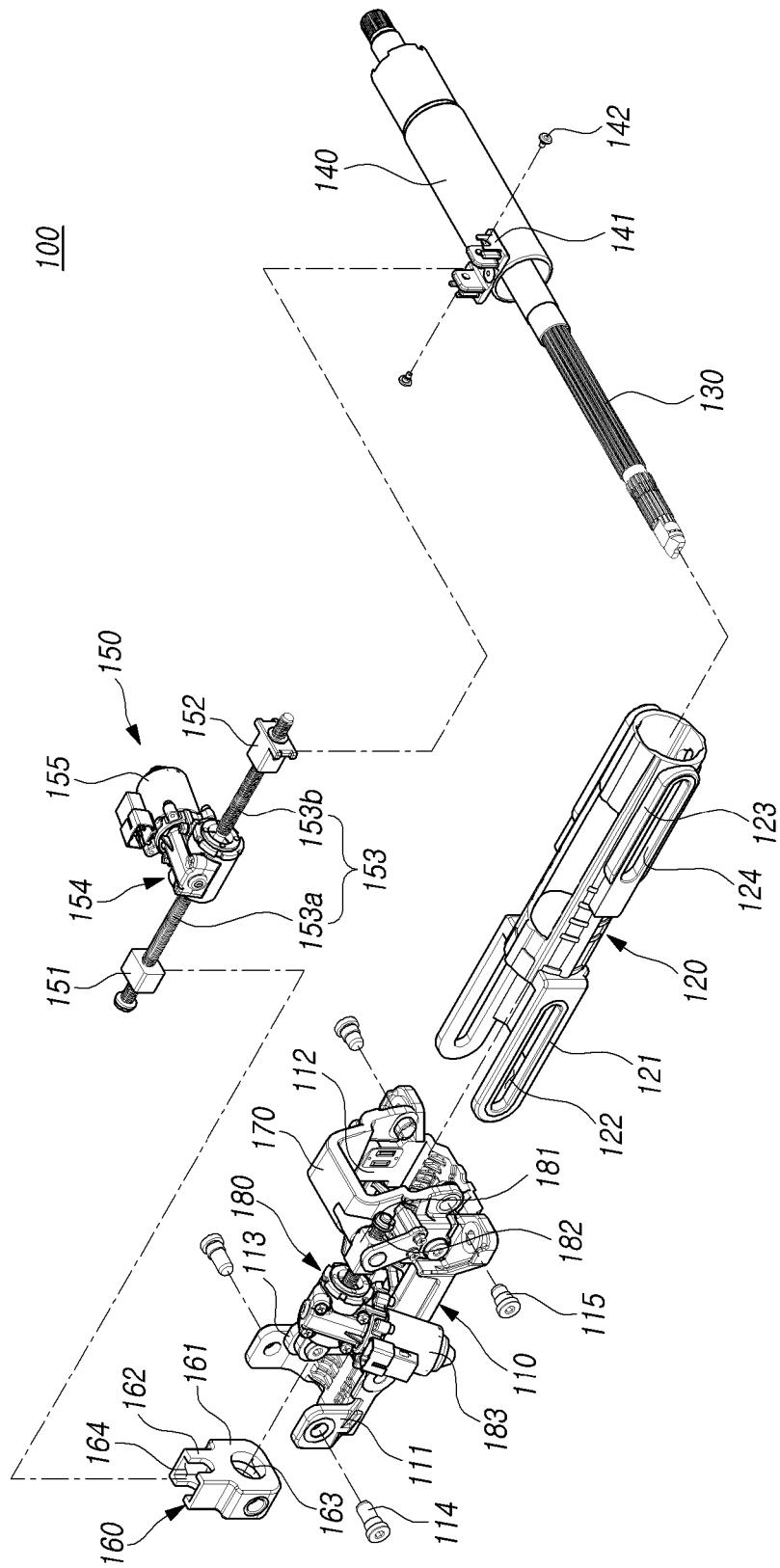
FIG. 1 is an exploded perspective view illustrating a steering column for a vehicle according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
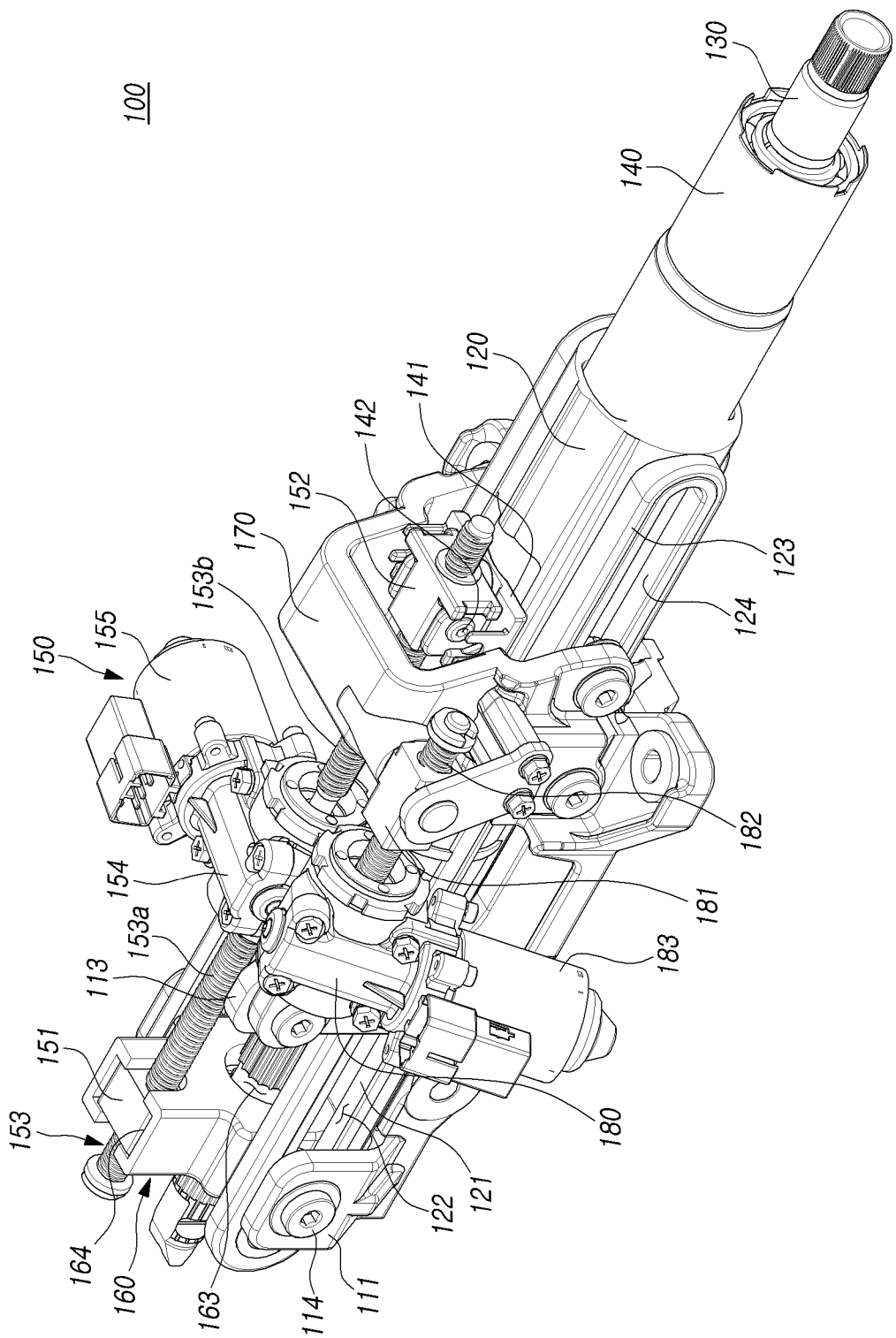
FIG. 2 is a perspective view illustrating an assembled state of FIG. 1.
Figure 3:
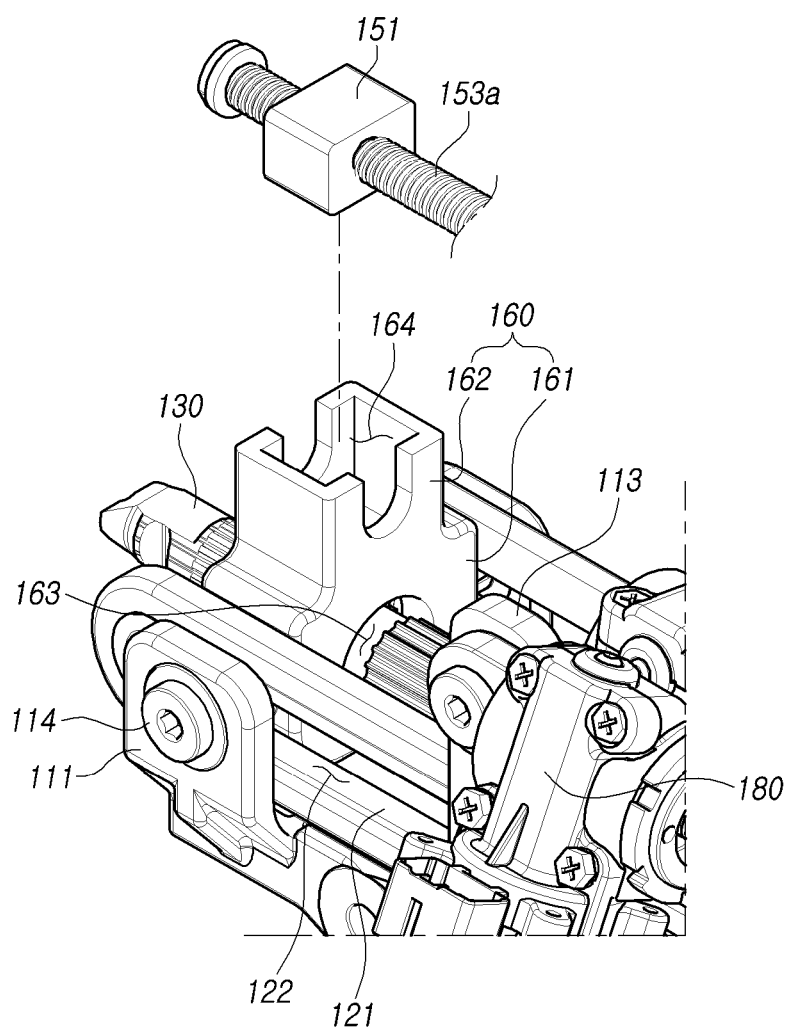
FIG. 3 is a perspective view illustrating a portion of FIG. 1.
Figure 4:
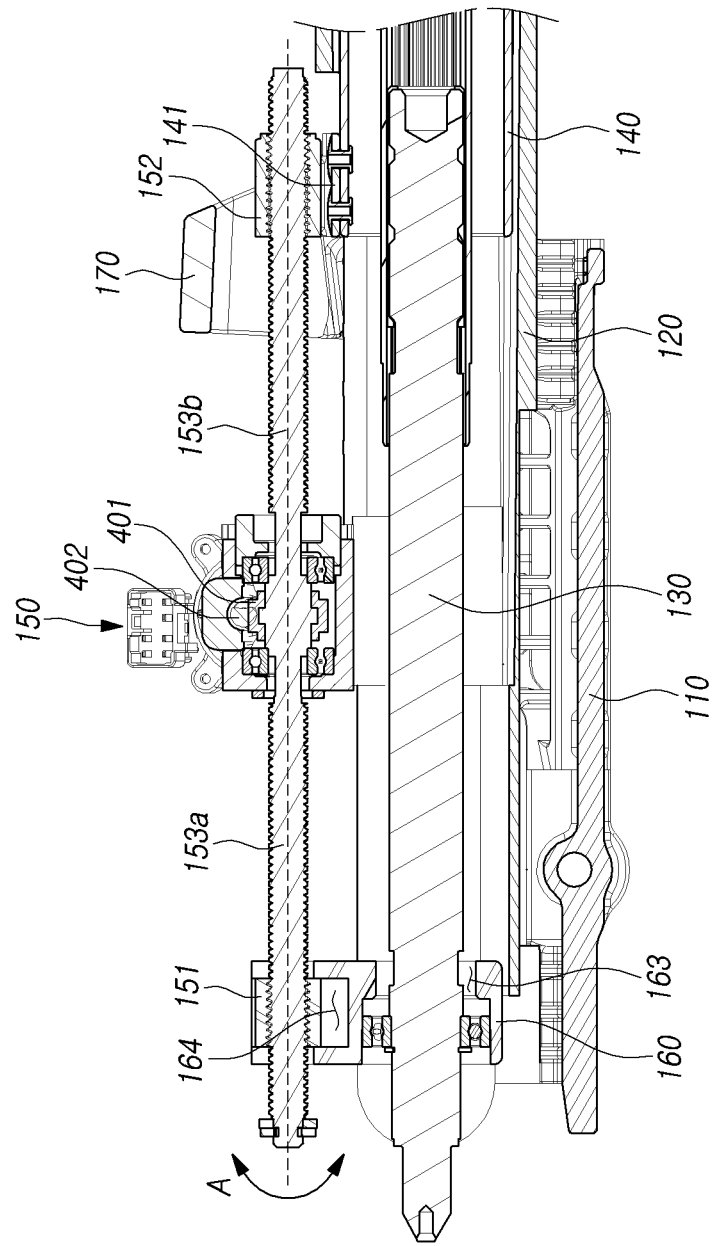
FIG. 4 is a cross-sectional view of FIG. 2.
Figure 5:
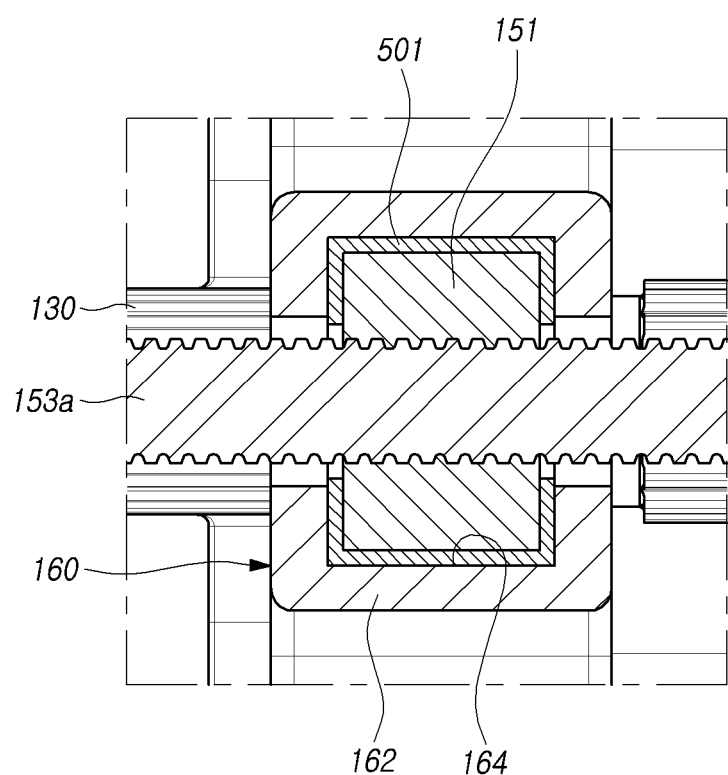
FIGS. 5 and 6 are cross-sectional views illustrating a portion of a steering column of a vehicle according to the present embodiments.
Figure 6:
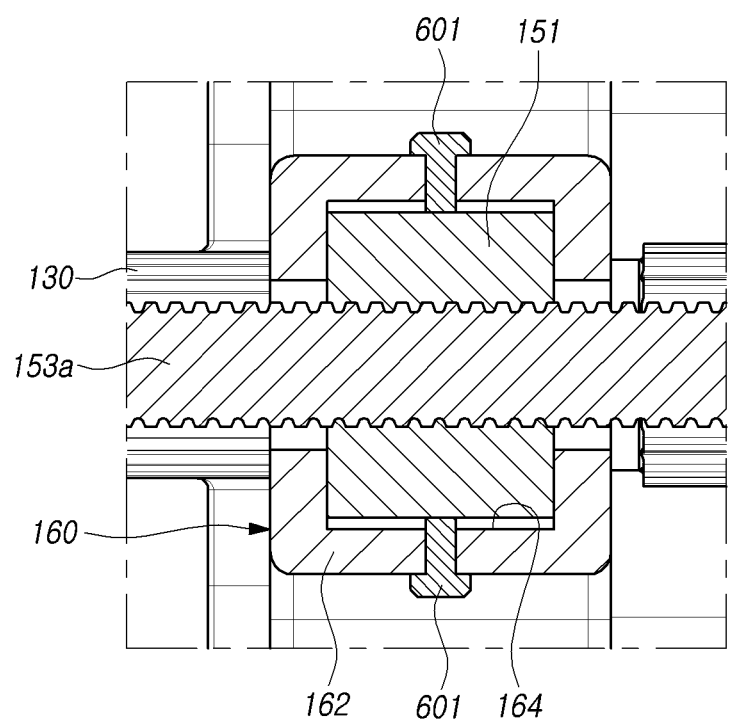
Figure 7:
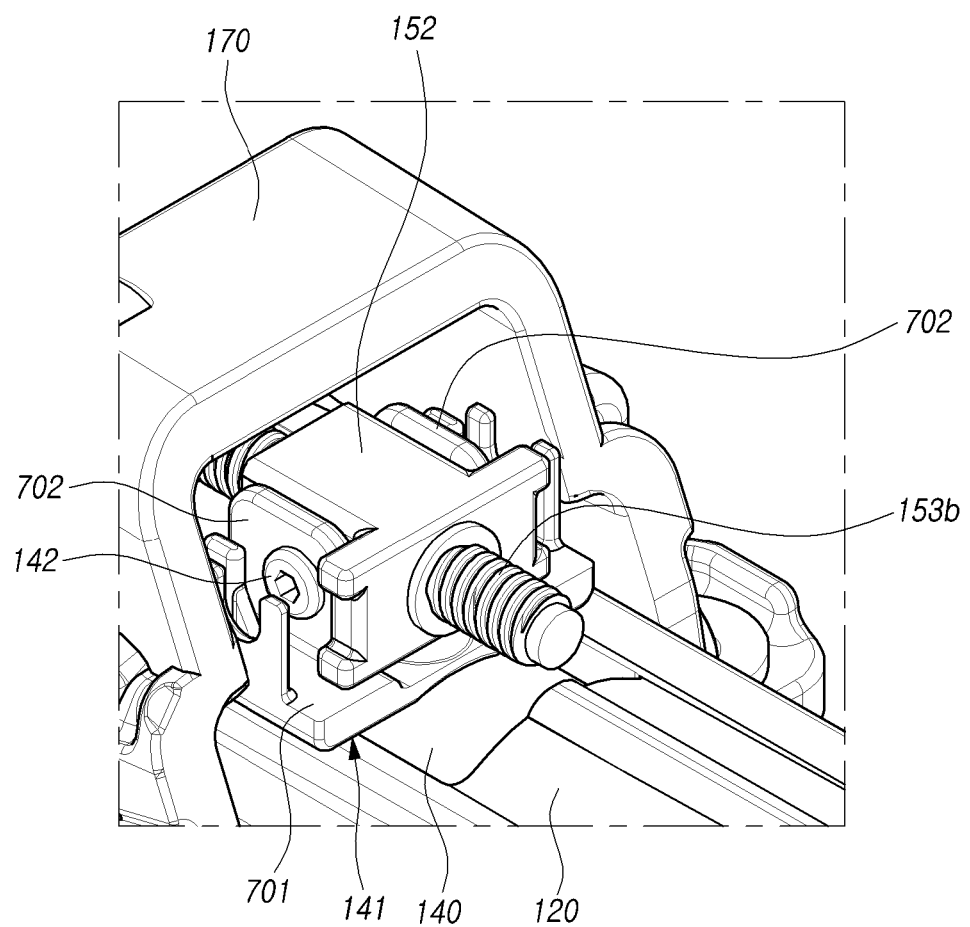
FIG. 7 is a perspective view illustrating a portion of FIG. 2.
Figure 8:
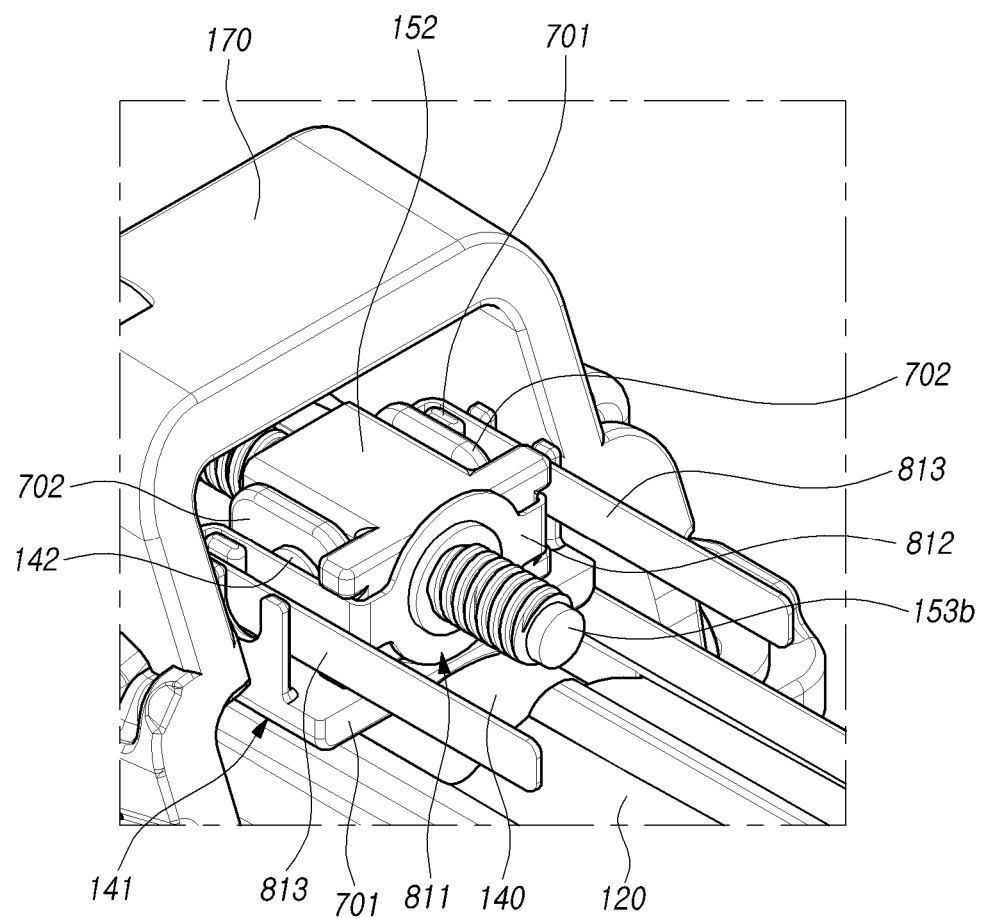
FIG. 8 is a perspective view illustrating a portion of a steering column for a vehicle according to the present embodiments.
Figure 9:
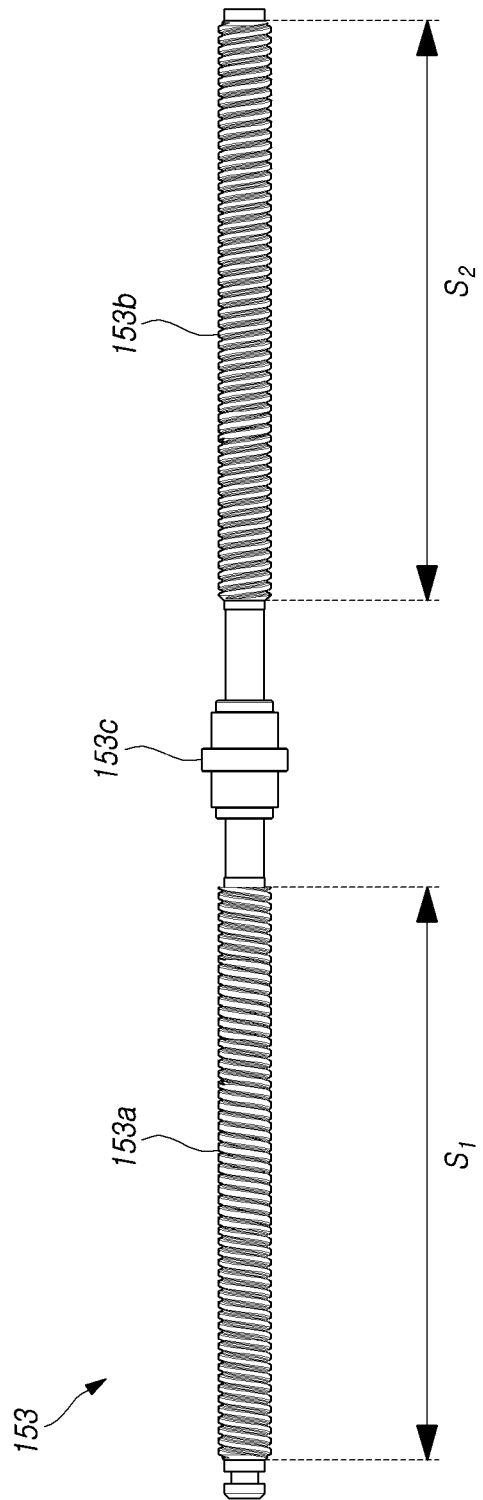
FIG. 9 is a side view illustrating a portion of a steering column for a vehicle according to the present embodiments.
Figure 10:
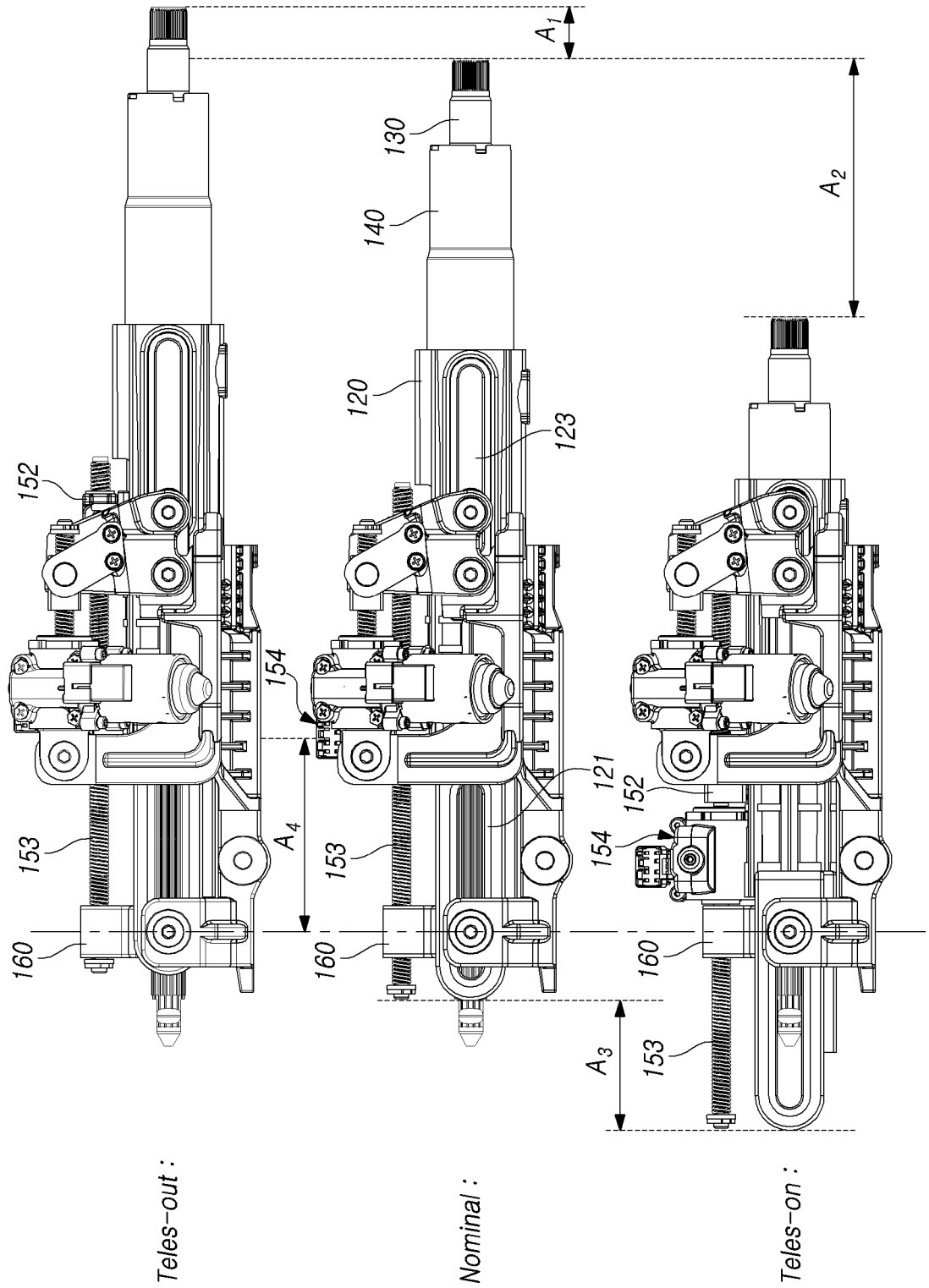
FIG. 10 is a side view illustrating an operation state of a steering column for a vehicle according to the present embodiments.
Figure 11:
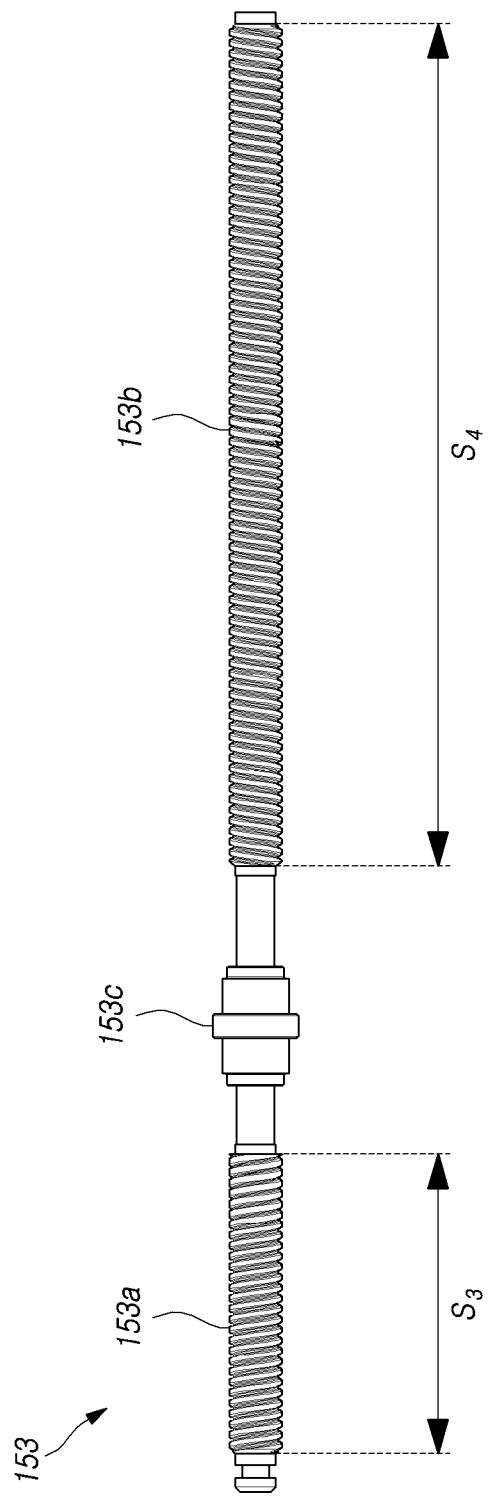
FIG. 11 is a side view illustrating a portion of a steering column for a vehicle according to the present embodiments.
Figure 12:
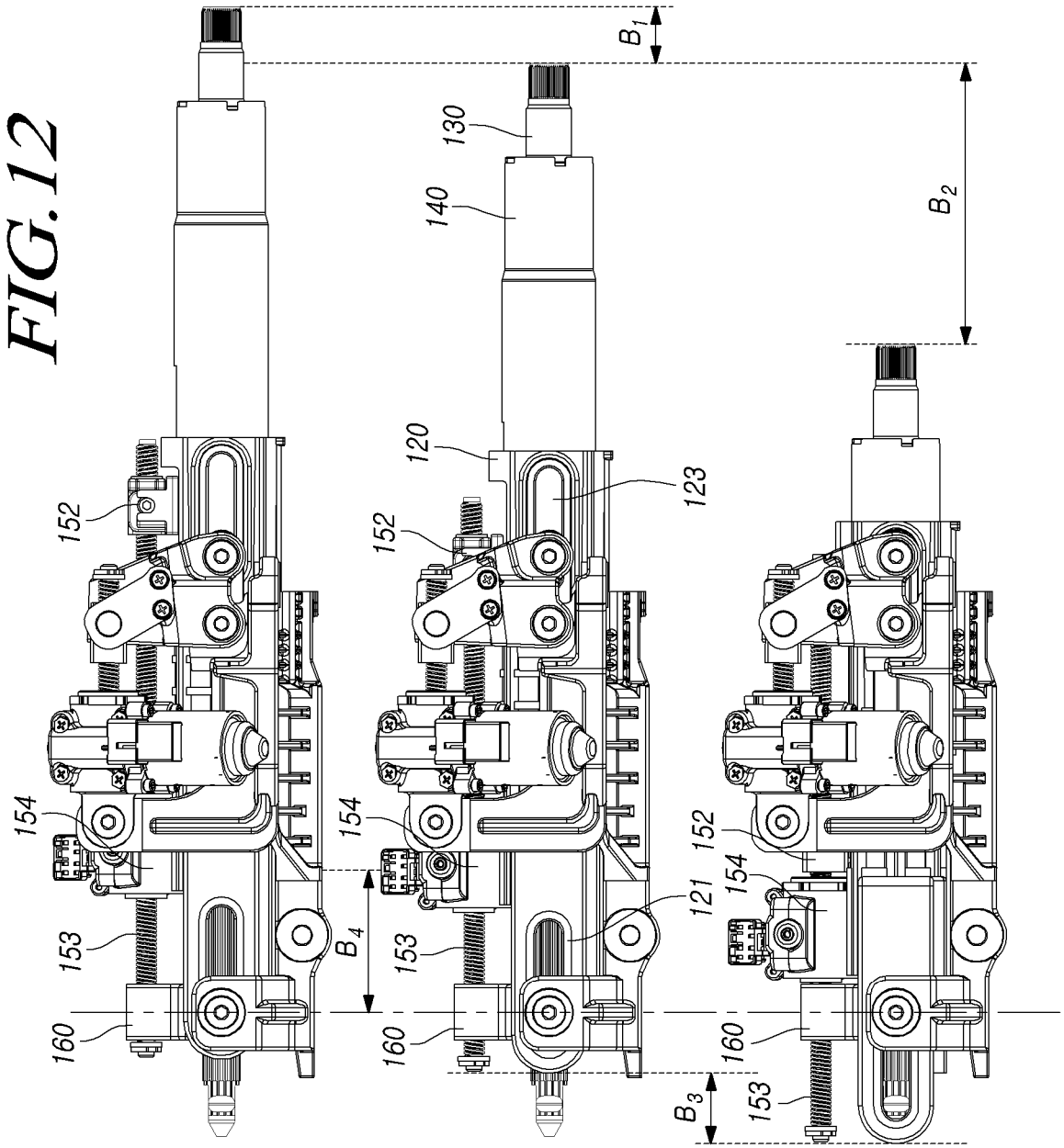
FIG. 12 is a side view illustrating an operation state of a steering column for a vehicle according to the present embodiments.
Figure 13:
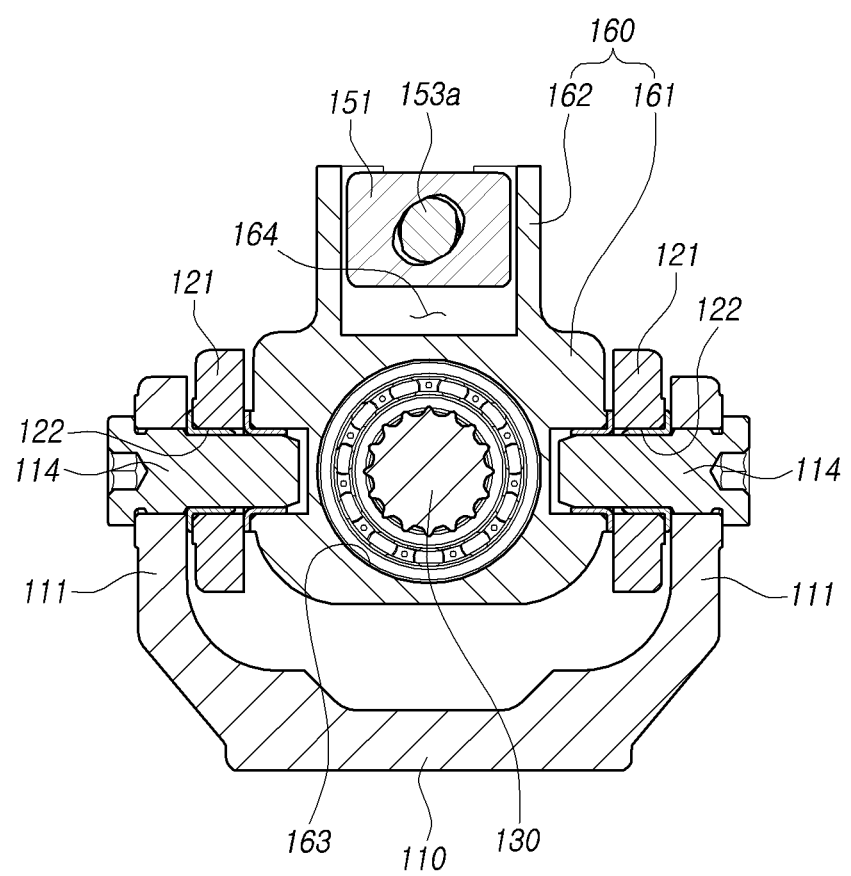
FIGS. 13 to 15 are cross-sectional views illustrating a portion of FIG. 2.
Figure 14:
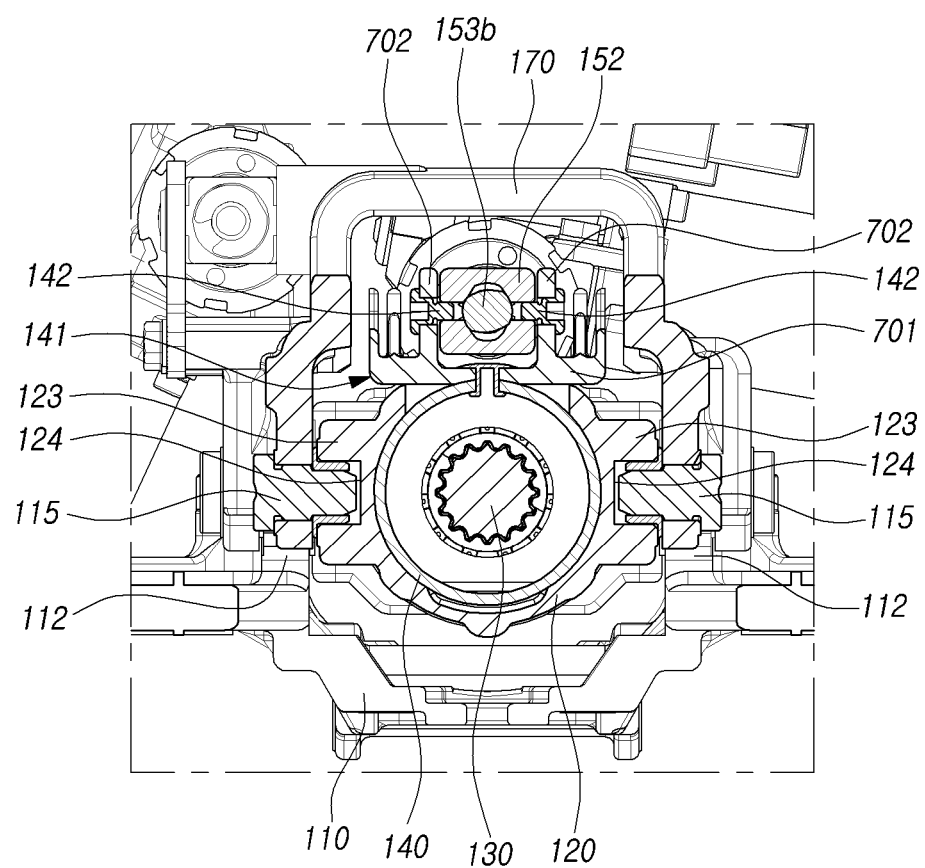
Figure 15:
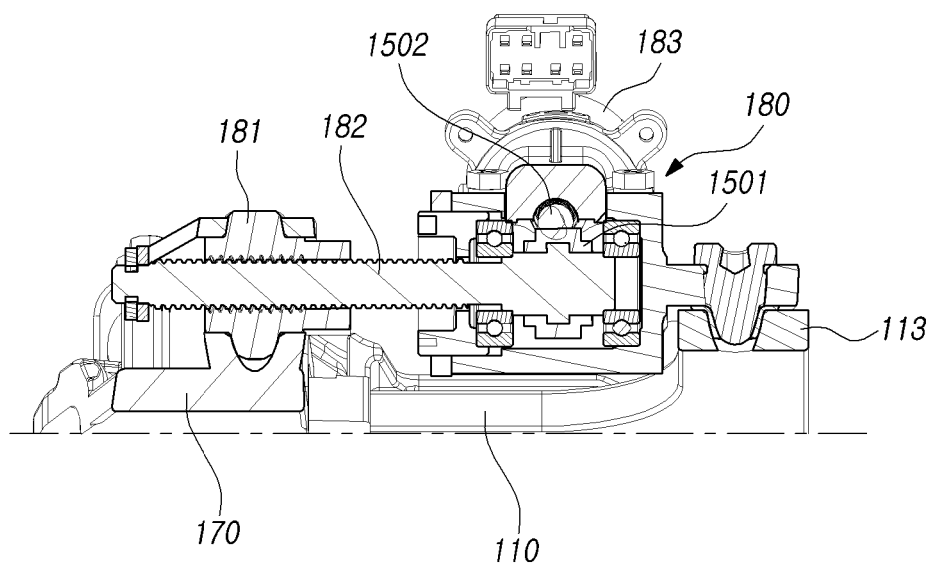

FIG. 1 is an exploded perspective view illustrating a steering column for a vehicle according to the present embodiments. FIG. 2 is a perspective view illustrating an assembled state of FIG. 1. FIG. 3 is a perspective view illustrating a portion of FIG. 1. FIG. 4 is a cross-sectional view of FIG. 2. FIGS. 5 and 6 are cross-sectional views illustrating a portion of a steering column of a vehicle according to the present embodiments. FIG. 7 is a perspective view illustrating a portion of FIG. 2. FIG. 8 is a perspective view illustrating a portion of a steering column for a vehicle according to the present embodiments. FIG. 9 is a side view illustrating a portion of a steering column for a vehicle according to the present embodiments. FIG. 10 is a side view illustrating an operation state of a steering column for a vehicle according to the present embodiments. FIG. 11 is a side view illustrating a portion of a steering column for a vehicle according to the present embodiments. FIG. 12 is a side view illustrating an operation state of a steering column for a vehicle according to the present embodiments. FIGS. 13 to 15 are cross-sectional views illustrating a portion of FIG. 2.

According to the present embodiments, a steering column 100 of a vehicle comprises a telescopic module 150 including a telescopic bolt 153 including a first bolt portion 153a and a second bolt portion 153b threaded in opposite directions, a first nut 151 coupled to the first bolt portion 153a, a second nut 152 coupled to the second bolt portion 153b, and a telescopic driving unit 154 rotating the telescopic bolt 153, a nut block 160 open to a radial side and having a guide hole 164 into which the first nut 151 is inserted, a mounting bracket 110 coupled with a lower tube 120 and having a lower end coupled with the nut block 160, and an upper tube 140 inserted into the lower tube 120, coupled with a steering shaft 130, and coupled with the second nut 152.

First, referring to FIGS. 1 and 2, the upper tube 140 and the lower tube 120 are hollow so that the steering shaft 130 is inserted on the inner circumferential surface of the upper tube 140, and the upper tube 140 is inserted on the inner circumferential surface of the lower tube 120.

The lower tube 120 is coupled to the mounting bracket 110 fixed to the vehicle body. The upper tube 140 is inserted on the inner circumferential surface of the lower tube 120 and is provided to be axially slidable, so that telescoping is performed in such a manner that the upper tube 140 is slid by the telescopic driving unit 154 while the steering wheel (not shown) connected to the steering shaft telescopes in or out.

A pair of first coupling portions 111 and a pair of second coupling portions 112, provided to widthwise face each other, are formed at a lower end and an upper end, respectively of the mounting bracket 110. The lower tube 120 is coupled between the pair of first coupling portions 111 by the first coupling member 114 and be coupled between the pair of second coupling portions 112 by the second coupling member 115.

Meanwhile, the lower tube 120 includes a first slide portion 121 coupled to the first coupling portion 111 and a second slide portion 123 coupled to the tilt bracket 170 to be axially slidable on the mounting bracket 110, which is described below.

The telescopic module 150 includes the telescopic bolt 153, the first nut 151, the second nut 152, and the telescopic driving unit 154.

The telescopic driving unit 154 includes the worm wheel 401 coupled to the telescopic bolt 153, the worm shaft 402 engaged with the worm wheel 401, and the telescopic motor 155 rotating the worm shaft 402 (refer to FIG. 4).

The telescopic bolt 153 includes a first bolt portion 153a and a second bolt portion 153b threaded in opposite directions. The first nut 151 is coupled to the first bolt portion 153a, and the second nut 152 is coupled to the second bolt portion 153b.

Meanwhile, the telescopic bolt 153 further includes a worm wheel coupling portion 153c coupled with the worm wheel 401 of the telescopic driving unit 154, and the worm wheel coupling portion 153c is provided between the first bolt portion 153a and the second bolt portion 153b (refer to FIGS. 9 and 11).

Subsequently, as the first bolt portion 153a and the second bolt portion 153b are threaded in opposite directions, when the telescopic bolt 153 is rotated by the telescopic driving unit 154, the first nut 151 and the second nut 152 axially slide close to or away from each other.

The first nut 151 is coupled to the mounting bracket 110 by the nut block 160, and the second nut 152 is coupled to the upper tube 140. Thus, when the telescopic driving unit 154 is driven, the mounting bracket 110 and the upper tube 140 slide closer to or away from each other with respect to the telescopic driving unit 154.

The bracket 141 is coupled on the outer circumferential surface of the upper tube 140, and the second nut 152 is coupled to the bracket 141 by a third coupling member 142, which is described below in detail.

In the conventional steering column, the upper tube is axially slid by the telescopic driving unit fixed with respect to the mounting bracket when telescoping is performed. In contrast, according to the present embodiments, when the telescopic driving unit 154 is driven, the telescopic driving unit 154 is slid on the mounting bracket 110 fixed to the vehicle body by the first bolt portion 153*a* and the first nut 151, and the upper tube 140 is slid on the telescopic driving unit 154 by the second bolt portion 153*b* and the second nut 152 so that the telescoping speed is significantly increased as compared with the conventional steering column.

Further, since the total telescopic stroke of the steering shaft 130 is the sum of the distance in which the first nut 151 is slidable on the first bolt portion 153*a* and the distance in which the second nut 152 is slidable on the second bolt portion 153*b*, the telescopic stroke is significantly increased as compared with the conventional steering column.

In other words, according to the present embodiments, it is possible to quickly perform telescoping with the increased telescopic speed without increasing the motor output. This presents advantages in terms of, e.g., motor size and costs. Since it is possible to increase the telescopic stroke without increasing the overall length of the steering column, it is possible to secure an installation space of the steering column.

In particular, an increase in the telescope-in stroke of the steering wheel is required to secure a convenient space for the driver when the vehicle travels in autonomous driving mode. The present embodiments may meet such telescope-in stroke and enables rapid telescoping.

Meanwhile, the tilting of the steering shaft 130 is performed by the tilt bracket 170 hinged to the second coupling portion 112 of the mounting bracket 110 and the tilt driving unit 180 hinged to the third coupling portion 113 of the mounting bracket 110, which is described below in detail.

Subsequently, in the present embodiments, the telescopic bolt 153 includes the first bolt portion 153*a* and the second bolt portion 153*b* and increases in the axial length as compared with the conventional steering device. Thus, if it fails to precisely secure at least one of the coaxiality of the first nut 151 and the second nut 152 or the coaxiality of the telescopic bolt 153 and the steering shaft 130, it may be rendered impossible to assemble the steering column and, even if possible, significant friction or noise may occur during telescoping or telescoping may be nearly impossible.

Referring to FIG. 3, in the present embodiments, to address such issues, the first nut 151 is inserted into the guide hole 164 which is formed to be open to a side in the radial direction The shape of the nut block 160 is discussed. The nut block 160 includes a body portion 161 coupled to the mounting bracket 110 by the first coupling member 114 and an extension 162 extending from the protrusion 312 to a side in the radial direction and having the guide hole 164.

The extension 162 may have a recess that is open to the radial side to allow the first bolt portion 153*a* to be seated thereon.

Further, for the lower end of the steering shaft 130 to be inserted and supported, the nut block 160 may have an insertion hole 163. That is, the insertion hole 163 may be formed to axially penetrate the body portion 161.

The first nut 151 inserted into the guide hole 164 is axially supported on the inner surface of the nut block 160 and is provided to be slidable widthwise or radially in the guide hole 164 so that it is possible to easily secure the coaxiality of the first nut 151 and the second nut 152 and the coaxiality of the telescopic bolt 153 and the steering shaft 130 by the slide of the first nut 151.

In other words, the radial and widthwise length of the guide hole 164 may be formed to be larger than the radial and widthwise length of the first nut 151.

As illustrated in FIG. 4, the second nut 152 is fixed to the upper tube 140 by the bracket 141, the second nut 152 is axially or widthwise slid in the guide hole 164 (refer to reference denotation A) and is disposed to be coaxial with the second nut 152, so that the telescopic bolt 153 may be coaxially disposed with the upper tube 140 and the lower tube 120.

Further, although the coaxiality is deteriorated due to an assembly error or road shocks, the deteriorated coaxiality may be corrected while the first nut 151 slides in the guide hole 164, thus leading to smooth telescoping.

In other words, for example, if the first nut 151 is integrally formed with the nut 320*b*, very precise machining is required to allow the first nut 151 and the second nut 152 to be coaxial with each other and the telescopic bolt 153 coupled to the first nut 151 and second nut 152 to be coaxial with the steering shaft 130, so that machining difficulty increases. However, as the guide hole 164 is formed in the nut block 160, and the first nut 151 is provided to be slidable in the guide hole 164, it is possible to easily secure the coaxiality of the first nut 151 and the second nut 152 and thus reduce machining difficulty.

Referring to FIG. 5, a damping member 501 may be provided to be supported between the inner surface of the nut block 160 and the outer surface of the first nut 151.

In other words, as the damping member 501 is compressed or extended, the first nut 151 is slid in the guide hole 164, securing coaxiality with the second nut 152, reducing friction and noise during slide, and hence enabling smooth telescoping.

As shown in the drawings, the damping member 501 may be a rubber damper surrounding the outer surface of the first nut 151 or a wave washer axially inserted between the first nut 151 and the nut block 160.

Alternatively, referring to FIG. 6, a fixing member 601, which penetrates the nut block 160 and has an end supported by the first nut 151, may be coupled to the nut block 160.

After the first nut 151 slides in the guide hole 164 and thus secures coaxiality with the second nut 152, the end of the fixing member 601 penetrates the nut block 160 and is then supported by the first nut 151 and fixed to the guide hole 164.

In other words, after the first nut 151 inserted into the guide hole 164 slides to secure coaxiality, the fixing member 601 is coupled to the nut block 160, fixing the first nut 151.

The fixing member 601 may be, e.g., a screw, and as shown in the drawings, be coupled to two opposite sides in the width direction of the extension 162 or two opposite sides in the axial direction to fix the first nut 151.

As such, as the first nut 151 slides in the guide hole 164, the coaxiality of the first nut 151 and the second nut 152 and the coaxiality of the telescopic bolt 153 and the steering shaft 130 may be secured with low machining difficulty. Thus, as compared with the conventional steering column, telescoping may smoothly be performed despite an increase in the length of the telescopic bolt 153.

Next, as described above, the second nut 152 is coupled to the upper tube 140. The bracket 141 may be coupled on the outer circumferential surface of the upper tube 140, and the second nut 152 may be coupled to the bracket 141.

As the first nut 151 is coupled to the mounting bracket 110 via the nut block 160, rather than directly, the second nut 152 is coupled to the upper tube 140 via the bracket 141.

In other words, the steering column of a vehicle according to the present embodiments has a structure in which the telescopic module 150 may be assembled after separately manufacturing the upper tube 140, lower tube 120, and mounting bracket 110, and each of the telescopic module 150 and the upper tube 140 may be assembled, and the first nut 151 is coupled to the nut block 160, and the second nut 152 is coupled to the bracket 141, and the telescopic module 150 is coupled with the mounting bracket 110 and the upper tube 140.

By such a structure, when the telescopic module 150 is damaged or broken, the telescopic module 150 alone may be replaced, and this ways leads to enhancement assemblability and mass-productivity.

Referring to FIG. 7, the bracket 141 includes a base portion 701 coupled to the upper tube 140 and first protrusions 702 protruding from the base portion 701 and supported on two opposite sides of the second nut 152.

The base portion 701 may be coupled to the upper tube 140 by, e.g., a rivet radially penetrating the base portion 701 and the upper tube 140, and the second nut 152 may be coupled between the first protrusions 702 by a screw widthwise penetrating the first protrusions 702.

In other words, the second nut 152 is inserted between the first protrusions 702 of the bracket 141 coupled to the upper tube 140, and an end of the screw penetrating the first protrusions 702 is coupled with the second nut 152 so that the second nut 152 is fixed to the bracket 141.

Referring to FIG. 8, a bending plate 811 is coupled to the second nut 152 and the bracket 141 to absorb impact during collapsing of the steering column.

The bending plate 811 includes a coupling portion 812 coupled to the second nut 152 and a bending portion 813 extending from the coupling portion 812, and the bracket 141 has a second protrusion 801 supported by the bending portion 813 during collapsing.

In other words, during collapsing, the telescopic bolt 153 and the second nut 152 are fixed by the mounting bracket 110, and the upper tube 140 and the bracket 141, along with the steering wheel, are axially slid so that the bending portion 813 is supported by the second protrusion 801 and is plastically deformed to absorb impact.

The bending plate 811 may have two bending portions 813 on two opposite sides of the second nut 152 in the width direction. By such a structure, the load point of the impact generated during collapsing is positioned on the center axis of the telescopic bolt 153 so that the telescopic bolt 153 is prevented from tilting during collapsing, enabling smooth collapsing while absorbing impact.

Referring to FIG. 9, the lead of the first bolt portion 153a may be identical to the lead of the second bolt portion 153b.

As the lead of the first bolt portion 153a is identical to the lead of the second bolt portion 153b, the first nut 151 and the second nut 152 slide the same distance when the telescopic bolt 153 rotates. Thus, the length of the first bolt portion 153a may be the same as the length of the second bolt portion 153b (S1=S2).

For example, the first bolt portion 153a and the second bolt portion 153b may be formed with the same lead as that of the telescopic bolt in the conventional steering column and, in such a case, the telescopic speed may be doubled.

FIG. 10 is a view illustrating telescoping when the leads of the first bolt portion 153a and the second bolt portion 153b are the same. As telescoping proceeds, the upper tube 140 slides up (refer to A1) or slides down (refer to A2).

As described above, the slide-down distance of the upper tube 140 may be set to be larger than the slide-up distance of the upper tube 140 (A2>A1) to increase the telescope-in stroke of the steering wheel.

Referring to FIG. 11, the lead of the first bolt portion 153a may be smaller than the lead of the second bolt portion 153b.

As the lead of the first bolt portion 153a is smaller than the lead of the second bolt portion 153b, the first nut 151 slides a shorter distance than the second nut 152 does when the telescopic bolt 153 rotates, so that the length of the first bolt portion 153a may be shorter than the second bolt portion 153b (S3<S4).

It is possible to reduce the lead of the first bolt portion 153a or increase the lead of the second bolt portion 153b. Given the self-locking condition of the screw, it is preferable to make the lead of the first bolt portion 153a smaller.

In the drawings, the lead of the first bolt portion 153a is identical to the lead of the second bolt portion 153b, but this is so done merely for convenience.

For example, the second bolt portion 153b may be formed with the same lead as that of the telescopic bolt in the conventional steering column while the first bolt portion 153a is formed with a smaller lead, in which case the telescopic speed is increased by the sliding speed of the first nut 151 on the first bolt portion 153a.

FIG. 12 is a view illustrating telescoping when the lead of the first bolt portion 153a is smaller than the lead of the second bolt portion 153b. As telescoping proceeds, the upper tube 140 slides up (refer to B1) or slides down (refer to B2).

As compared with the foregoing embodiment shown in FIGS. 9 and 10, the total telescope strokes may be rendered to be identical (A1+A2=B1+B2) by forming the sums of the lengths of the first bolt portion 153a and the second bolt portion 153b to be the same (S1+S2=S3+S4).

Likewise, the slide-down distance of the upper tube 140 may be set to be larger than the slide-up distance of the upper tube 140 (B2>B1) to increase the telescope-in stroke of the steering wheel.

As the lead and length of the first bolt portion 153a are formed to be shorter than the lead and length of the second bolt portion 153b, the distance to which the lower tube 120 protrudes downward when the steering wheel telescopes in may be reduced (B3<A3), so that the space occupied by the steering column during telescoping may be minimized, thereby enabling easier securing of an installation space and preventing interference with the surrounding components.

Further, as the distance in which the first nut 151 slides on the first bolt portion 153a is reduced so that the telescopic driving unit 154 is positioned lower (B4<A4), it is possible to minimize the noise to the driver during telescoping.

Next, as described above, the lower tube 120 may be coupled to the mounting bracket 110 to be axially slidable. The telescopic driving unit 154 is coupled to the lower tube 120 so that the telescopic driving unit 154 and the lower tube 120 may be integrally slid during telescoping.

In other words, for the telescopic driving unit 154 to stably slide during telescoping, the lower tube 120 is coupled to the mounting bracket 110 to be axially slidable, and the telescopic driving unit 154 is coupled to the lower tube 120, so that the telescopic driving unit 154 and the lower tube 120 are integrally slid.

The telescopic driving unit 154 may include a housing for receiving the worm wheel 401, worm shaft 402, and the worm wheel coupling portion 153c of the telescopic bolt 153 and to which the telescopic motor 155 is coupled (refer to FIG. 4). The housing may be screwed to the lower tube 120, or the housing and the lower tube 120 may be integrally formed.

The lower tube 120 includes the first slide portion 121 coupled to the lower end of the mounting bracket 110 to be axially slidable and the second slide portion 123 coupled to the upper end of the mounting bracket 110 to be axially slidable. The coupling structure of the lower tube 120 and the mounting bracket 110 is described below in detail.

Referring to FIGS. 1, 2, and 13, a pair of first coupling portions 111 widthwise facing each other with the nut block 160 interposed therebetween are provided at the lower end of the mounting bracket 110.

The first slide portion 121 includes the first guide portion 122 widthwise penetrated and axially elongated and is provided between the nut block 160 and the first coupling portion 111.

The first guide portion 122 is inserted into the first coupling portions 111, and is coupled with the first coupling member 114 having an end coupled to the nut block 160.

As shown in the drawings, the first slide portion 121 extends from the lower end of the lower tube 120. A pair of first slide portions 121 may be provided and be inserted between the nut block 160 and the first coupling portions 111.

The first coupling member 114 penetrates the first coupling portions 111, is inserted into the first guide portions 122, and is coupled with the first slide portion 121 and the nut block 160.

As the first guide portion 122 is axially elongated, the first slide portion 121 is axially slidable while being coupled to the first coupling member 114, and the slide of the lower tube 120 is supported by the first coupling member 114 while telescoping is performed (refer to FIGS. 10 and 12).

The nut block 160 includes a body portion 161 coupled to the first coupling member 114 and an extension 162 extending from the protrusion 312 to a side in the radial direction and having the guide hole 164.

The nut block 130 may have an insertion hole 163 into which the steering shaft 130 is inserted. That is, the insertion hole 163 may be formed to axially penetrate the body portion 161.

In the insertion hole 163, the steering shaft 130 may be supported on the nut block 160 via a bearing. The nut block 160 is hinged to the first coupling portion 111 by the first coupling member 114 so that the lower end of the steering shaft 130 may be supported by the nut block 160 during tilting.

In other words, the first coupling member 114 is, e.g., screwed, to the first coupling portion 111, and its middle portion is inserted into the first guide portion 122 so that, during telescoping, the first slide portion 121 is supported by the middle portion of the first coupling member 114 while sliding.

The end of the first coupling member 114 is hinged to the nut block 160 so that, during tilting, the nut block 160 is rotated along with the steering shaft 130.

A bushing may be provided on the middle portion and end of the first coupling member 114 to reduce friction.

Referring to FIGS. 1, 2, and 14, a pair of second coupling portions 112 widthwise facing each other with the lower tube 120 interposed therebetween are provided at the upper end of the mounting bracket 110.

The second slide portion 123 includes the second guide portion 124 widthwise depressed and axially elongated and is provided to face the inner surface of the second coupling portion 112.

The tilt bracket 170 is hinged to the outer surface of the second coupling portion 112.

The second coupling member 115 having an end inserted into the second guide portion 124 is coupled to the tilt bracket 170.

The second slide portion 123 is provided to face the inner surface of the second coupling portion 112 on the outer circumferential surface of the lower tube 120, so that the second guide portion 124 is formed to be depressed from the outer circumferential surface of the lower tube 120 and to be elongated axially.

The tilt bracket 170 is formed in a substantially U-shape and may be coupled to the outer surface of each second coupling portion 112.

The second coupling member 115 penetrates the tilt bracket 170 and its end is inserted into the second guide portion 124 so that the tilt bracket 170 and the second slide portion 123 are coupled.

As the second guide portion 124 is axially elongated, the second slide portion 123 is axially slidable while being coupled to the second coupling member 115, and the slide of the lower tube 120 is supported by the second coupling member 115 while telescoping is performed (refer to FIGS. 10 and 12).

In other words, the second coupling member 115 is, e.g., screwed, to the tilt bracket 170, and its end is inserted into the second guide portion 124 so that, during telescoping, the second slide portion 123 is supported by the end of the second coupling member 115 while sliding.

Meanwhile, tilting of the steering shaft 130 is performed by the rotation of the tilt bracket 170.

In other words, since the tilt bracket 170 is hinged to the second coupling portion 112, and the tilt bracket 170 and the second slide portion 123 are coupled together by the second coupling member 115, as the tilt bracket 170 is rotated about the second coupling portion 112, the lower tube 120 and the upper tube 140 are rotated about the first coupling portion 111, and the steering shaft 130 is tilted.

During tilting, relative rotations occur between the first coupling member 114 and the first slide portion 121 and between the second coupling member 115 and the second slide portion 123.

The rotation of the tilt bracket 170 is achieved by the tilt driving unit 180. In other words, a tilt nut 181 coupled with the tilt bolt 182 is hinged to the tilt bracket 170, and the tilt driving unit 180 rotating the tilt bolt 182 is hinged to the mounting bracket 110.

The tilt driving unit 180 is coupled to the third coupling portion 113 of the mounting bracket 110 and, as shown in the drawings, the third coupling portion 113 may be provided between the first coupling portion 111 and the second coupling portion 112.

Referring to FIG. 15, the tilt driving unit 180 includes a worm wheel 1501 coupled to the tilt bolt 182, a worm shaft 1502 engaged with the worm wheel 1501, and a tilt motor 183 for rotating the worm shaft 1502.

Accordingly, as the tilt motor 183 rotates, the tilt nut 181 is slid on the tilt bolt 182, and the tilt bracket 170 is rotated to perform tilting by the slide of the tilt nut 181.

By the so-shaped steering column of a vehicle, it is possible to easily secure an installation space of a steering column while increasing the telescopic stroke, quickly perform telescoping without increasing the motor output, reduce noise during telescopic operation, and enhance the assemblability and mass-productivity of steering columns.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

The instant patent application claims priority under 35 U.S.C. 119(a) to Korean Patent Application No. 10-2020-0022660, filed on Feb. 25, 2020, in the Korean Intellectual Property Office, the disclosure of which is herein incorporated by reference in its entirety. The present patent application claims priority to other applications to be filed in other countries, the disclosures of which are also incorporated by reference herein in their entireties.

The invention claimed is:

1. A steering column of a vehicle, comprising:
a telescopic module including a telescopic bolt including a first bolt portion and a second bolt portion threaded in opposite directions, a first nut coupled to the first bolt portion, a second nut coupled to the second bolt portion, and a telescopic driving unit rotating the telescopic bolt;
a nut block open to a radial side and having a guide hole into which the first nut is inserted;
a mounting bracket coupled with a lower tube and having a lower end coupled with the nut block; and
an upper tube inserted into the lower tube, coupled with a steering shaft, and coupled with the second nut,
wherein a damping member is provided in the guide hole to be supported between an inner surface of the but block and an outer surface of the first nut.

2. The steering column of claim 1, wherein the telescopic driving unit includes a worm wheel coupled to the telescopic bolt, a worm shaft engaged with the worm wheel, and a telescopic motor rotating the worm shaft.

3. The steering column of claim 1, wherein a fixing member penetrating the nut block to have an end supported by the first nut is coupled to the nut block.

4. The steering column of claim 1, wherein a bracket is coupled on an outer circumferential surface of the upper tube, and the second nut is coupled to the bracket.

5. The steering column of claim 1, wherein a lead of the first bolt portion is identical to a lead of the second bolt portion.

6. The steering column of claim 1, wherein a lead of the first bolt portion is smaller than a lead of the second bolt portion.

7. The steering column of claim 1, wherein the lower tube is coupled to the mounting bracket to be axially slidable, and wherein the telescopic driving unit is coupled to the lower tube.

8. The steering column of claim 7, wherein the lower tube includes a first slide portion coupled to a lower end of the mounting bracket to be axially slidable and a second slide portion coupled to an upper end of the mounting bracket to be axially slidable.

9. The steering column of claim 8, wherein the lower end of the mounting bracket is provided with a pair of first coupling portions facing each other widthwise, with the nut block interposed therebetween,
wherein the first slide portion includes a first guide portion widthwise penetrated and axially elongated and is provided between the nut block and the first coupling portion, and
wherein the first coupling portion is coupled with a first coupling member inserted into the first guide portion and having an end coupled to the nut block.

10. The steering column of claim 9, wherein the nut block has an insertion hole into which the steering shaft is inserted.

11. The steering column of claim 10, wherein the nut block is hinged to the first coupling portion by the first coupling member.

12. The steering column of claim 8, wherein the upper end of the mounting bracket is provided with a pair of second coupling portions facing each other widthwise, with the lower tube interposed therebetween,
wherein the second slide portion includes a second guide portion widthwise depressed and axially elongated and is provided to face an inner surface of the second coupling portion,
wherein a tilt bracket is hinged to an outer surface of the second coupling portion, and
wherein a second coupling member having an end inserted into the second guide portion is coupled to the tilt bracket.

13. The steering column of claim 12, wherein a tilt nut coupled with the tilt bolt is hinged to the tilt bracket, and
wherein a tilt driving unit rotating the tilt bolt is hinged to the mounting bracket.

* * * * *